Sept. 16, 1969  F. FAULHABER  3,467,847
DIRECT-CURRENT MOTOR
Filed March 17, 1966  6 Sheets-Sheet 1

INVENTOR
Fritz Faulhaber
by Singer, Stern & Carlberg
Attorneys

Sept. 16, 1969     F. FAULHABER     3,467,847

DIRECT-CURRENT MOTOR

Filed March 17, 1966     6 Sheets-Sheet 4

INVENTOR
Fritz Faulhaber
by Singer, Stern & Carlberg
Attorneys

Sept. 16, 1969　　　F. FAULHABER　　　3,467,847
DIRECT-CURRENT MOTOR

Filed March 17, 1966　　　6 Sheets-Sheet 6

INVENTOR
Fritz Faulhaber
by Singer, Stern & Carlberg
Attorneys

United States Patent Office 3,467,847
Patented Sept. 16, 1969

3,467,847
DIRECT-CURRENT MOTOR
Fritz Faulhaber, Schonaich, Germany, assignor, by mesne assignments, to Retobobina Handelsanstalt, Schaan, Liechtenstein
Filed Mar. 17, 1966, Ser. No. 535,134
Claims priority, application Germany, Apr. 1, 1965, F 45,687; Feb. 4, 1966, F 48,350
Int. Cl. H02k 1/22
U.S. Cl. 310—266                                    13 Claims

ABSTRACT OF THE DISCLOSURE

A direct-current motor of the miniature type with a stationary cylindrical core magnet, a stationary motor housing and a bell-type iron-less rotary armature whose hollow cylindrical portion extends into an annular air gap formed between the outer circumference of the core magnet and the inner circumference of the motor housing. The hollow cylindrical portion of the armature comprises a self-supporting winding one end of which embraces with the loops of its winding radially outwardly extending teeth on a circular carrier disc which is fixedly attached to the armature shaft. The loops formed in the winding are fixedly attached to the teeth and form the sole attachment of the armature winding to the carrier disc.

---

This invention relates to improvements in direct-current motors and in particular to such motors having a bell-type armature.

It is an object of the present invention to provide particularly for this type of motors improved mechanical mounting means for securing their armature winding to the motor shaft. In the prior art, there have been proposed various mounting means for the purpose in view, so, for instance, it has been suggested to fixedly secure the winding of the bell-type armature at the commutator end to a single disc arranged at right angles to the motor shaft and fixedly secured thereto. The disc in these constructions carries the armature which is open ended opposite to the commutator and thus takes the shape of a bell, the fact from which its name is derived. The disc carrying the armature winding is identified as "carrier disc" throughout this specification. Other solutions for the problem of securing the armature winding have been disclosed in the pertinent field, but this invention is aiming at a construction having only one carrier disc in a bell-type armature and at providing means for fixedly securing the commutator to the motor shaft.

The prior art constructions referred to have the drawback that the winding, which has been completed in a previous step, must later be attached to the carrier disc in one or several assembly operations. The present invention makes it possible to avoid such additional work.

With such an object in view, the present invention provides a disc of insulating material, which is toothed around its periphery, as a carrier body for the winding and as a sturdy mounting member on the shaft.

In the construction as provided, the commutator may be fastened to the armature and to the shaft in any well-known manner. It may, for instance, be pressed on the shaft as a separate unit and connected by leads to the armature as in general practice, or, as also well-known, the commutator may be carried on a hub of the carrier disc, or it may be in the form of a printed circuit put directly on one side, preferably the outside, of the carrier disc. The last-mentioned construction results in a toothed carrier disc commutator combination that can be readily produced and easily mounted.

In accordance with another object of this invention, each tooth of the carrier disc is engaged by one wire loop or coil loop, formed by the winding at the commutator end, in such manner that the wire or coil projects only in front of a tooth beyond the face of the carrier disc. The number of teeth is thereby equal to the number of coils and the teeth are uniform in size and shape.

In accordance with this invention, the armature winding is wound directly into the spaces or slots of the carrier disc during the winding process so that a subsequent and separate mounting of the winding on the disc becomes unnecessary. Thus, the winding of the armature and its mounting on the carrier disc becomes one single manufacturing operation.

In a modified more practical form of the invention, the teeth of the carrier disc may project in radial direction somewhat beyond the winding inserted in the spaces therebetween, whereby the toothed carrier disc including teeth forms a flat integral construction element that preferably can be punched out from sheet stock of insulating plastics.

Within a further pursuit of the invention, it is also possible to utilize a substantially circular disc of insulating material for the carrier disc and arrange the teeth at its periphery under an angle with respect to the face of the disc. In such a case, the carrier disc, when considered as a whole, has a three-dimensional configuration. Also here, the teeth are of uniform size and are all inclined under the same angle with respect to the face of the disc. It has been found that inclined teeth facilitate the winding procedure, because the magnet wire can be wound more readily and positively around the outwardly slanting teeth and it becomes more tightly seated in place. Such a carrier disc is preferably wound directly into the armature winding with its outwardly pointing teeth slanting toward the commutator end and projecting in axial direction over the face of the disc, for instance, so that all teeth slant at the same angle, say at 30 degrees, and so lie within a conical surface of an imagined cone.

With reference to the straight teeth of the carrier disc, previously mentioned, it can be additionally stated that the width of these teeh is preferably clearly greater than their height or length. This results in relatively narrow tooth spaces which, for instance, may be just as wide as the teeth themselves.

In contrast thereto, the slanted teeth of the carrier disc are preferably narrower with a form that is more long than wide. Furthermore, these teeth are advantageously rounded at their tips, which form also facilitates winding of the wires or coils. Also, such a height to width relationship makes possible a smaller tooth pitch, which fact is of advantage for winding armatures with small wire sizes. Whenever slanted teeth have a pitch which, due to narrow width of teeth, give wider spaces than considered proper for straight teeth, it becomes possible to arrange in these wider spaces more wires or heavier wires than would be possible in narrow spaces. This makes it possible to build motors of higher output rating with the same armature size, i.e., stronger motors with the same space requirement. Generally, it has been found advisable to make the slanted teeth, in consideration of the required motor output, as narrow as practical selection of material and manufacture will permit. As lowest limit of tooth width, based on the strength of presently available injection molding materials that are suitable for such slant-toothed carrier discs, a measure of, say, 3 mm. may be selected. Then the spaces between teeth will be as wide as possible.

Still another object of the invention is to provide inexpensive carrier discs with slanted teeth that can be produced from suitable plastics by spray casting or injection molding. Carrier discs formed by such methods are less expensive than punched discs with straight teeth. Moreover, the molding process allows for materials of greater strength and the finished unit is practically free of burs that cannot be avoided on a punched-out piece.

The advantages of an armature having a carrier disc with teeth around its periphery, as provided by this invention, become particularly evident in direct-current motor armatures that are equipped with skew windings as disclosed in the United States Patent No. 3,191,081. In this type of winding, wherein the wires or coils lie at a skew angle around the periphery of the armature, these wires or coils, owing to their skewed arrangement, embrace the projecting teeth of the carrier disc to a great extent and very tightly, and the preferred form of the carrier disc with forwardly slanting teeth is even more effective in increasing the tightness of the winding seat. The wires of the completed skew winding lie, with straight as well as slanted teeth, non-movably in place, particularly so when the winding, after insertion of the coils, is treated with a varnish that bonds the wires and coils and anchors particularly the oppositely skewed coil sides at their crossing points. The importance of such a reinforced armature winding, which resists positively and successfully any subsequent forces tend to deform the winding, has in the operation of the motor an inestimable value as will be realized by those skilled in the art. In motors having windows without skew, i.e., having wires or coils extending in axial direction of the amature, an anchoring of the winding on the teeth of the carrier disc is also advantageous in view of the prior art, but here remains a certain possibility that the coils, for example, after very long operation of the motor, become dislodge and shift in their straight portions causing pressure between adjacent wires with the result of shorts or other electrical failures affecting the operation of the motor, impairing its output or causing a breakdown. The secure anchoring of the skewed wires and coils by their close and tight embrace of the teeth reduces considerably the danger of winding failure, because in the skewed arrangement of the winding, the anchoring of the coils at the teeth of the carirer disc and furthermore the inherent internal rigidity of the skew winding produce in an unexpected manner a practically indestructible bell-type armature. Subsequent varnish bonding by impregnating and baking helps further to secure the coils at their crossing points for greater strength of the whole rotating rotor member.

A furher object of this invention is an improved carrier disc with slanting teeth of thermoplastics material. With a disc of such material, it is possible to reheat the teeth and bend or form them over the coil ends at the commutator end in any desirable fashion after the whole winding has been placed and tightened in the tooth spaces or slots. In this construction, the teeth can be remolded so at no projections of teeth and winding ends extend outside the cylindrical surface of the armature toward the internal surface of the stator. Consequently, the air gap between rotor and stator can be made smaller than when teeth ends project into the gap. Moreover, the ruggedness of the joint between winding and its carrier disc is still further enhanced by such remolding process.

A few preferred embodiments of the invention will now be described with reference to the accompanying drawings but with a clear understanding that additional embodiments are possible without departing from the general scope of the invention.

Figure 10:
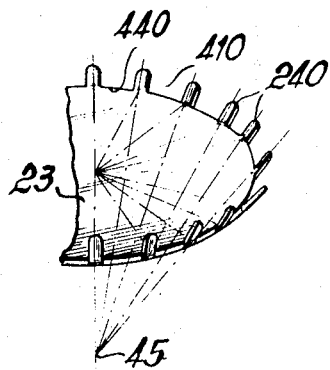
FIG. 10 is a fragmentary perspective view of a toothed carrier disc according to this invention, wherein the teeth at the periphery of the disc are inclined or slanted with spect to the face of the disc.
Figure 11:
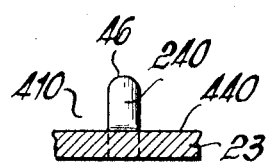
FIG. 11 is a diagrammatic representation of a slanted tooth shown projecting from a fragmentary section of the carrier disc.
Figure 12:
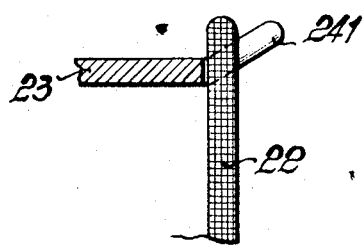
Figure 13:
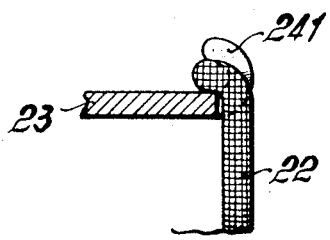

FIG. 12 is a fragmentary sectional view of an armature portion illustrating an outwardly slanting tooth, here somewhat longer than in FIGS. 10 and 11 for reason that the carrier disc here is made of a thermoplastic material which allows a shaping down of the teeth after the installation of the winding; and FIG. 13 is a similar view as in FIG. 12 showing tooth and coil end in final position after reheating and remolding of the thermoplastics tooth.

Figure 1:
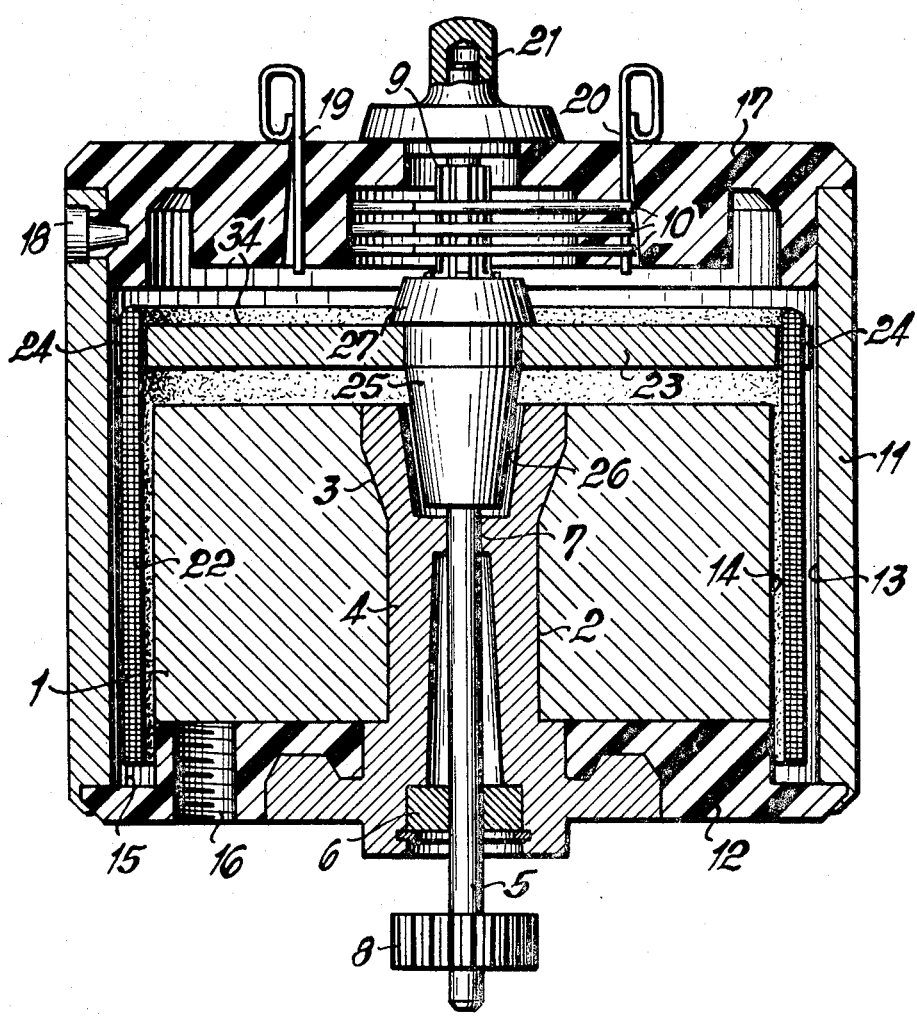
FIG. 1 is a schematic cross-sectional view of a direct-current motor having a bell-type armature equipped with a carrier disc having teeth around its periphery, as provided by this invention.

FIG. 1 illustrates one example of the type of motor in which the present invention is utilized. The stationary core magnet, preferably in the form of a permanent magnet, has a bore 2, 3 lined with a bushing 4 through which the rotatable motor shaft 5 extends. A shaft bearing 6 is fitted in bushing 4 and all these parts are stationary except the shaft 5. The shaft 5 is journaled in the bearing 6 and at 7 directly in the bushing 4. A bearing similar to 6 could, of course, be inserted at 7 in the bushing 4 if desirable. The shaft 5 is shown to carry a pinion 8 at its outwardly extending free end, but other means for power take-off, such as a pulley or the like, can be mounted on the shaft extension. The other end of the shaft 5 has fixedly mounted thereon a commutator 9 on which the brushes 10 ride. The commutator 9 is shown as an example, and it can take entirely different forms as will be described hereinafter. The outer shell or housing 11 of the motor forms the return path for the magnetic flux and is secured to the stationary core magnet 1 by an annular end plate 12 of non-magnetic material. Thus, the whole assembly of the parts 1, 4, 11 and 12 is stationary. The annular end plate 12 closes the motor at the end of its shaft extension carrying pinion 8. The motor housing 11 with its inner cylindrical surface 13 and the outer cylindrical surface 14 of the core magnet 1 are spaced apart to form an annular air gap 15. A bore 16, as shown in the end plate 12, serves for assembly purposes only and does not contribute anything to the usefulness of the motor. It may be plugged up if desired. At the commutator end, the motor is closed by an end cover or motor end bell 17 of insulating material. This cover 17 is secured to the motor housing 11 by radial screws 18 or other suitable fastening means and is thus also a stationary part of the motor. The leads 19 and 20 of the motor are preferably embedded in the cover 17. The lead 20 is shown connected to one set of brushes 10. Another set of brushes is connected with the other lead. The end cover 17 may be provided at its center portion with a hub 21 to serve as an end bearing for motor shaft 5. The arrangement of this bearing may take any conventional form and forms no part of the present invention.

Figure 8:
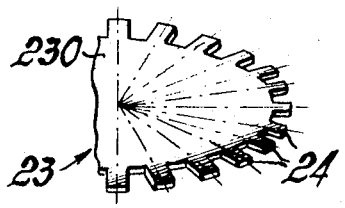
FIG. 8 is a fragmentary perspective view of a toothed carrier disc, according to this invention, for a bell-type armature, wherein the teeth are straight, i.e., level with the disc.

The bell-type armature 22, referred to in the pertinent literature also as "hollow rotor" and known per se, is arranged for free rotatable movement in the annular air gap 15 between the outer surface 14 of core magnet 1 and the inner surface 13 of the magnetic-return-path-forming housing 11. This bell-type armature 22 is open at the drive end of the motor (identified by pinion 8) and is secured at the commutator end to a carrier disc 23 extending radially from shaft 5 to abut the cylindrical winding portion 22 of the armature at right angles. The carrier disc 23 is fixed to the shaft 5 to rotate therewith. The carrier disc 23, in accordance with this invention, is provided at its periphery with teeth, which, as indicated by numeral 24 in the embodiment shown in FIG. 1, and as further clearly illustrated in FIG. 8, extend radially outwardly in the same plane with the disc and project beyond the armature winding 22. Thus, the winding coils lie within the slots formed between the teeth.

The number of teeth around the periphery of the carrier disc 23 has a predetermined certain relationship to the number of commutator segments. The number of coils wound into an armature is equal to the number of teeth and thus equal to the number of slots. This feature will be described hereinafter in greater detail with reference to FIGS. 6 and 7.

In the embodiment shown as an example in FIG. 1, the motor shaft 5 carries rigidly mounted a conical hub 25 which extends inside the motor into a conical recess 26 of the bushing 4 in the core magnet 1. This construction affords convenient and positive assembling of the shaft 5, the carrier disc 23 and the armature winding 22, as a complete rotor into the stationary unit consisting of the parts 1, 12 and 11, namely the core magnet, the annular end plate and the outer shell. With the rotor in place, it remains only to secure the drive member (the pinion 8) on the shaft extension and to mount the motor cover or end bell 17 on the opposite end to have the motor ready for running.

Again, in the embodiment illustrated, the commutator 9 is rigidly fastened ot the carrier disc 23 by means of a hub 27 secured to or molded integrally with the disc 23 of insulating plastics, which disc, as previously mentioned, is carried by the motor shaft 5 for rotational movement therewith. The commutator body 9 is seated on the hub 27 and is mechanically secured thereto.

Figure 2:
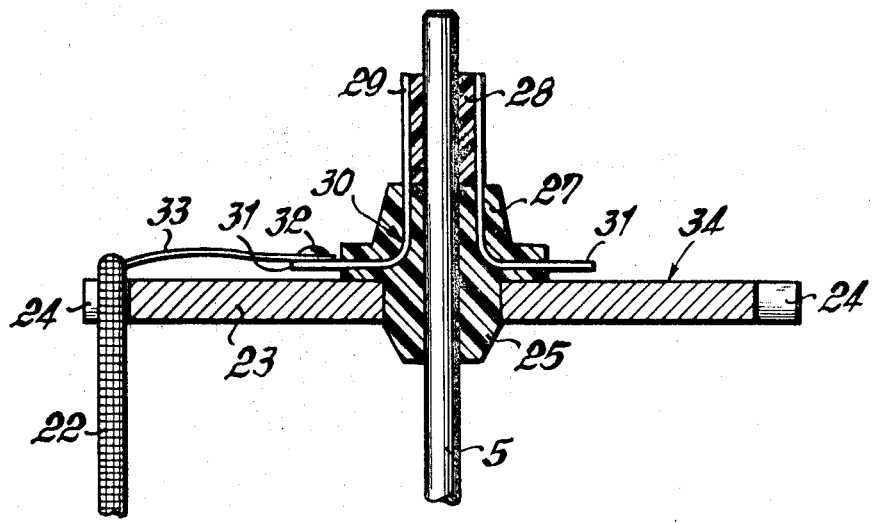
FIG. 2 is a fragmentary sectional view of a toothed carrier disc assembled with a commutator and of a construction somewhat modified from FIG. 1.

However, the commutator can take different forms, such, for instance, as shown diagrammatically in FIG. 2. In this figure the parts being equivalent to the ones in example FIG. 1 are designated by similar numerals. A few details of the motor are not repeated in FIG. 2 for the sake of clearness, since only the construction of the commutator, which is different from the conventional forms, is to be described. This commutator in conjunction with the toothed carrier disc 23, as provided by this invention, gives a preferred structural solution of this combination. As already mentioned with reference to FIG. 1, the hub is rigidly seated on motor shaft 5. Here this hub 27 carries as an extension a cylindrical outwardly pointing commutator body 28 in which commutator segments 29 are embedded. These segments 29 extend, as indicated at 30, into the plastics hub 27 and project at 31, radially outwardly from the hub with respect to shaft 5. At 32 there is indicated, over proportion enlarged, a soldered joint by which the extensions 30 of the commutator segments 29 are conductively connected, in a well-known manner, to the leads 33 of the armature winding 22. Also in this FIG. 2 are shown at the periphery of the carrier disc 23 the teeth 24 projecting radially beyond the winding 22.

In place of the commutator constructions as illustrated in FIGS. 1 and 2, it is also possible to employ, in accordance with this invention, a printed commutator configuration. Such a commutator may be printed preferably directly on the outer face 34 of the carrier disc 23 as can be taken from FIGS. 3 and 6, whereby in FIG. 6 some random leads 40 can be seen extending from the winding to commutator segments 38. The system of connecting such commutator 38 depends largely on the form and construction of the commutator and its particular application. In its basic principle and function, such a cmmutator follows the same consideration and general rules as established generally for conventional direct-current motors, and the methods for printed circuits are used to deposit the commutator segment on the face 34 of insulating carrier disc 23. The brushes, of course, must here be urged in axial direction against the face-type commutator and must be positioned correspondingly, i.e., with their axes parallel to the motor axis and thus turned 90 degrees from the position indicated in FIG. 1. Their angular position on the commutator depends, of course, on the type of the coils and their connections to the segments in accordance with the well established rules of current-magnetic flux relationship in direct-current motors. In view of the multitude of winding and connecting possibilities, all known in the pertinent art, it appears to be unnecessary here to enter into greater detail. The worker skilled in the art will be able to devise connecting diagrams without an inventive step after having received the teaching of printing the commutator and its connections on the outer face 34 of the carrier disc 23. It may be worthwhile, however, to mention that any desirable angular displacement is possible between a commutator segment and the location of a coil of the winding 22 on the periphery of the carrier disc 23 to which it is connected. The final step in completing the armature is the connecting-up of all winding coil leads to the respective segments around the commutator, as generally practiced in armature winding.

The carrier disc may also take a modified form in that it may consist of an outer toothed rim, a hub for mounting on the shaft, and spokes or the like connecting the hub with the rim. In such construction, the printed commutator may be arranged on or inside the rim, or a commutator body of conventional construction may be employed.

In consideration of all details given, it should be understood, that for practicing the present invention it is immaterial which form the motor takes as long as it is a direct-current motor having a bell-type armature as specified. Within this limitation, however, the motor may have several forms. It is quite possible, for instance, to magnetize the core magnet system electrically by suitable field coils be used in conventional direct-current motors. For convenience, such magnetizing field coils could be arranged in the outer shell or housing 11 (FIG. 1) forming the magnetic flux return path. When so modified, the housing will take the form of an electrically energized magnetic field pole system.

Figure 3:
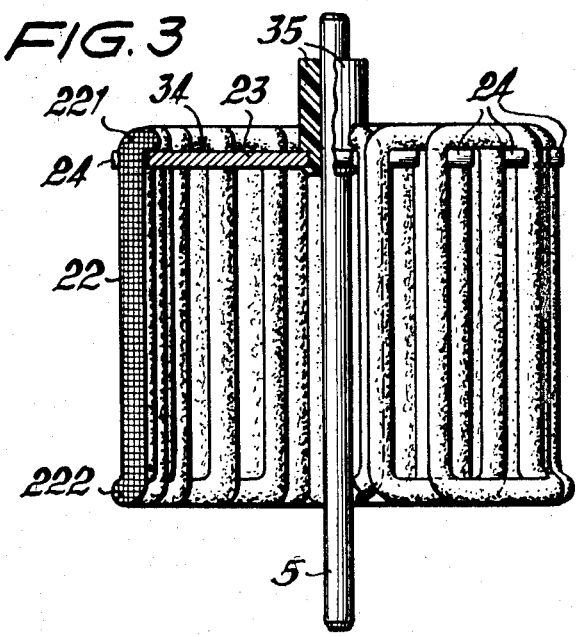
FIG. 3 illustrates a bell-type armature having a toothed carrier disc according to this invention, wherein the right half is a plan view and the left half is shown in cross section.

Another embodiment of a bell-type armature is shown in FIG. 3. Here the interlinking of the winding 22 with the teeth 24 of carrier disc 23, as provided by this invention, is clearly illustrated, particularly in the cross-sectional view at the left-hand side of the figure. The disc 23 of insulating material has the commutator printed on its face 34 and is provided with a hub 35 rigidly secured to the motor shaft 5. In manufacturing, the armature winding 22 is wound with one end of the coils directly into the toothed disc 23 in such way that the free ends of the teeth 24 project radially beyond the winding as indicated. The length of the teeth 24 is optional and they may be made even longer as shown, for instance, so long that they project beyond the winding for a distance equal to the thickness of the coils. When so extended, they will serve simultaneously as blades of a fan for effecting, when running, a flow of air through the air gap 15 (FIG. 1) to cool the winding. The FIG. 3 shows also clearly the arrangement of the coils of winding 22 in the slots formed in the disc 23 by the teeth 24.

FIG. 3 also makes it clear, particularly when looking at the cross-hatched section of the winding at the left-hand side, that the winding 22 extends in axial direction beyond the carrier disc 23 as indicated at 221. Such extension of the coil ends is a preferred form provided by this invention and facilitates considerably the manufacturing procedure of joining the winding 22 with the disc 23. As shown at 221, the end of the winding which extending axially beyond the carrier disc 23, may be crimped inwardly toward the shaft 5 to form a bead around the disc which increases the tightness of the seat of the winding on the disc. At the other end of the winding 22, which is the open end or the mouth of the bell-type armature and which is shown pointing downwardly in FIG. 3, the winding coils are crimped outwardly as shown somewhat exaggerated at 222. Outward crimping of the winding at its open end can be readily performed on the winding machine and facilitates mounting of the armature in the motor, because then the armature can be pushed readily over the core magnet 1 (FIG. 1) into its operating position after the armature 22, the carrier disc 23, and the shaft 5 have been combined to form a subassembly.

Figure 4:
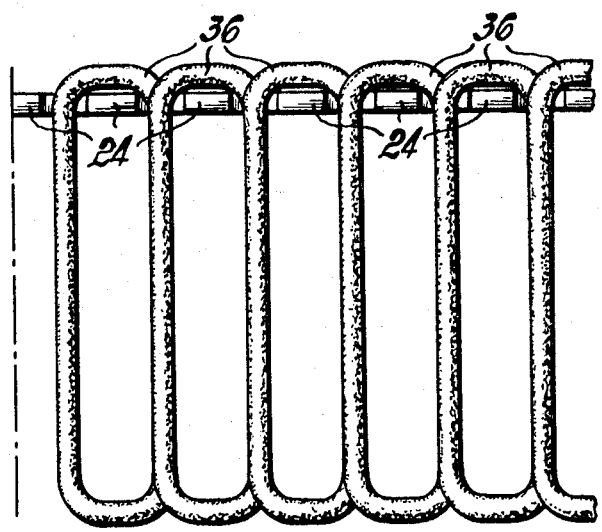
FIG. 4 is a diagrammatic plan view of a portion of an armature winding with straight coils in axial direction showing the position of the carrier disc teeth with respect to the coils.

The winding indicated in FIG. 3 is shown as a two-layer chorded-pitch coil winding. In such a winding, the wire beginning in one slot returns into the next adjacent slot. However, depending on the number of poles in the motor, the coils may be wound to embrace more, and in special cases considerably more teeth, but it should be understood that all such winding arrangements are considered to be within the scope of this invention. Fundamentally, every known winding for direct-current motors with bell-type armatures can be employed in the presently disclosed motor. Two examples of possible windings are shown diagrammatically in FIGS. 4 and 5. Here it is depicted how the armature can be constructed and in what position the wires or coils lie relative to the teeth 24 of the carrier disc 23. The illustrations show the coils at a considerably enlarged scale, and it should be considered that actually they lie very closely adjacently to one another. The FIG. 4 shows a winding with straight coil sides and FIG. 5 a winding with skewed coil sides. From inspection of the diagrams it will be clear that the coils 36 (FIG. 4) and 37 (FIG. 5) lie in the slots formed by the teeth 24 projecting from the plane of the drawing toward the viewer. Thus, they pass along the sides of the teeth. Such arrangement has considerable advantages particularly in conjunction with the preferably employed two-layer winding as will be further explained hereinafter with reference to FIG. 7.

Figure 5:
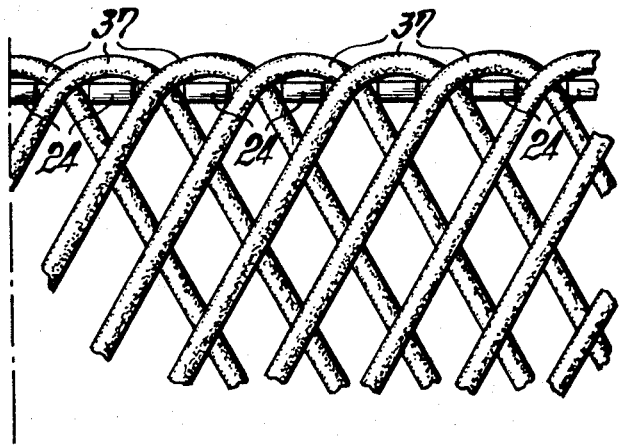
FIG. 5 is a similar view as in FIG. 4 but with skewed coil sides.

The FIG. 4 represents a winding example in which the number of poles of the motor is equal to the number of teeth in the carrier disc. In several other cases, when the number of poles is lower, the winding will progress from one coil side in a certain space over two or more teeth and will enter after the last spanned tooth into the next slot and from there will run parallel to the first coil side. Such arrangement is known by itself from direct-current motor windings with straight axially extending coil sides in which the coils are held on the periphery of a smooth disc, but without the teeth as disclosed by this invention. A winding having coils spanning more than one tooth is provided and illustrated in conjunction with the toothed carrier disc of FIG. 3. In the arrangement of FIG. 3 as well as FIG. 4, each one of the teeth 24 of carrier disc 23 is being embraced by the reversing loop formed at the commutator end by each coil. In this order the wires of the coil cannot run crosswisely or diagonally over the carrier disc but they must pass within the slots provided therefor. After passing through the slots, the coils change their direction and return, when only one tooth is spanned as shown in FIGS. 4 and 5, at the other side of the same tooth. When more than one tooth is spanned, as clearly indicated in the upper right-hand portion of FIG. 3, the coils continue to run along the face of the carrier disc, pass the predetermined number of teeth (two are shown in FIG. 3) and enter the next following space for the return path over the armature. Whether the winding span is over one or several teeth, the wires of the coils seat themselves very tightly in the spaces no matter what type of winding is applied. However, a particularly solid construction can be obtained when employing the skewed winding scheme as diagrammatically illustrated in FIG. 5. This type of winding is known per se, but its full benefit is actually realized only in conjunction with the present inventive toothed carrier disc. Generally it can be said that the useless winding heads, normally formed at the ends of stator and rotor windings of conventional design, are avoided in the windings according to this invention.

Figure 6:
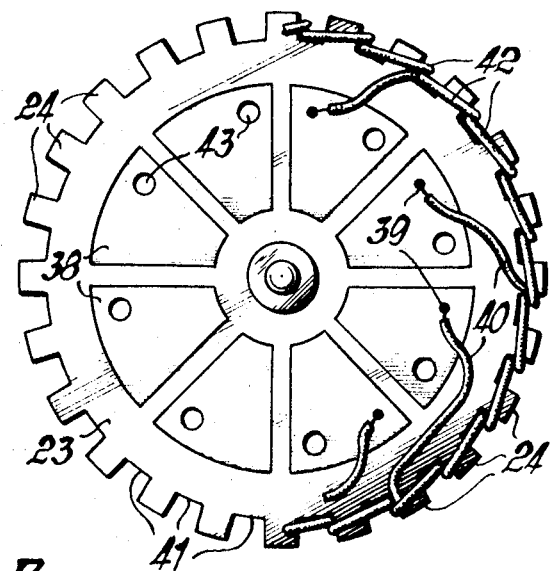
FIG. 6 is a plan top view of a toothed carrier disc in accordance with this invention showing in the right-hand portion the respective positions of the wound coils.

The toothed carrier disc 23 itself is shown in plan view in FIG. 6, where also the arrangement of the winding thereon is indicated on one half of the disc.

The embodiment of the carrier disc 23 illustrated in FIG. 6 serves as example only. It has the feature of carrying on the face, that is destined to become the outside, a printed-circuit commutator. As an example there are shown eight commutator segments 38, but it is clear that any other number of segments may be printed. The soldered joints where the leads 40 from the winding are soldered to the respective segments 38 are indicated at 39.

The number of teeth 24 has a predetermined relationship to the number of commutator segments. The portion of a coil that is located at the outside of the carrier disc 23 can be designated as the end of a coil when considering the whole length of the armature cylinder through which the coil extends as its length. This designation appears to be proper regardless of the fact that generally during the winding process the coil wire will be wound uninterruptedly several times into one slot 41 between two teeth 24. It can also be said that each coil end extends around one tooth 24 and reaches into two adjacent slots 41. If so considered, it becomes clear that the number of teeth is equal to the number of coils. When this winding rule would not be observed, there would result an unsymmetrical winding having bulges and valleys resulting besides having other drawbacks, in an unbalanced rotor and an irregularly running motor. In general, it is advisable to make the width of the teeth 24 about equal to the width of the slots 41. The tooth thickness depends to a large extent upon the size of the magnet wire to be used for the winding. If a heavy wire is used, it is advisable to select a heavy disc 23 with correspondingly strong teeth 24. With smaller wire sizes thinner discs and lighter teeth may be chosen. As an illustrative example, a miniature motor may be considered whose bell-type armature takes a winding with a wire of 0.1 millimeter diameter. With such winding being contemplated, the teeth could be made 1 millimeter wide and the slot 1.5 millimeters wide, whereby the number of teeth must be in conformity, as above stated, with the number of coils, and further, the number of coils must be in conformity with the number of commutator segments. Either there belongs to each coil a commutator segment or groups of equal numbers of coils are interconnected and common leads brought out to corresponding commutator segments. All such winding arrangements are governed by the common rules for direct-current armature windings and are here employed in conjunction with the present invention.

The right-hand portion of FIG. 6 illustrates that the coil sides 42 overlap in the slots 41. A description of this arrangement will follow with reference to FIG. 7.

In order to obtain during construction of the armature in the winding machine always the same location for the teeth 24 of the winding-carrying disc 23, it is advisable to provide holes 43 in the disc which serve as centering means and means for engaging a drive pin for winding the coils. To serve their purpose, these holes 43 have a predetermined position with respect to the teeth 24 and this position is given by the design of the winding machine and the location of the guide and drive pins thereon. The holes 43 have no function in the operation of the motor and they may be closed after the armature has been wound, or may be utilized for connecting the winding leads 40 to the commutator segments 38, or the leads may be fed through or inserted in these holes for soldering if desired.

Figure 7:
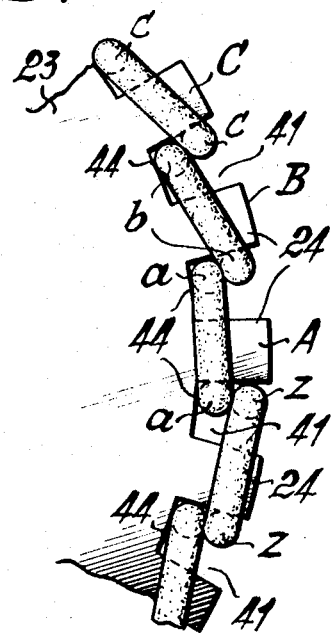
FIG. 7 is a fragmentary side elevation of a carrier disc illustrating the relative positions of its teeth, the tooth spaces or slots and a two-layer coil winding.

The overlapping arrangement of the coil sides in the slots 41 of the carrier disc 23 has been mentioned above in connection with FIG. 6 and will now be described in detail with reference to FIG. 7. In this figure only the rim portion of the carrier disc 23 with its teeth 24 and its slots 41 is indicated. The wires forming the coil sides lie in the slots 41 and embrace so to say the teeth 24. For a better understanding of this complete arrangement, reference may here be had also to the diagrammatic showing in the FIGS. 4 and 5. In FIG. 7, both coil sides of the coil embracing the tooth A are designated by the letter $a$. They lie at the bottoms 44 of the slot 41 due to the fact that these are the coil sides wound in on the armature first when starting to produce it. If now the slots would be relatively wide, for instance, twice as wide as the tooth width and perhaps five or six times larger than the cross-sectional area of a coil side, then all coil sides would lie at the bottoms of the slots and one would have, even with the toothed carrier disc 23 of this invention, only the generally known single layer winding in which all coil sides lie adjacently one to another around the periphery in a symmetrical fashion. Inherently, such a single layer winding can accommodate only relatively few winding turns with the result of a relatively low efficiency and an inferior stability of the armature as has been experienced in service with motors of the single layer winding type.

In direct-current motors according to the present invention, the disadvantages just enumerated are overcome by utilization of the also known two layer winding. With this winding about twice as many turns of the same wire size can be accommodated than in a single layer. The two-layer winding is generally preferred for larger motors and has proved successful also in fractional-horsepower and miniature direct-current motors.

In the present application, such a two-layer winding requires relatively narrow slots 41, for instance, such having a maximum width of about two to three times the coil thickness. Such relatively narrow slots provide, however, not sufficient space for two coils to lie side by side to each other. As will be noted, there are two coil sides in each slot and this is also true for the skewed winding (FIG. 5) as well as for the straight winding (FIGS. 3 and 4). Since in a narrow slot, the two coil sides cannot lie side by side, they must be superposed in overlapping fashion as indicated in FIGS. 6 and 7. With this arrangement there can be accommodated in every slot 41 a great number of conductors. This leads to considerable advantage particularly in view of the single-layer winding with its limited conductor capacity. With two coil sides superposed in the slots, the overlapping arrangement of the coil ends, as illustrated in FIG. 7, is a necessary consequence. This will now be described:

When the second coil with coil sides $b$ is wound on the carrier disc, which is done subsequently of winding coil $a—a$, there is no space left at the bottom 44 between the teeth A and B, because this space is already taken by one coil side $a$. Now, there lie in the slot 41 between teeth A and B two coil sides of which coil side $b$ lies higher, i.e., radially at a greater distance from the motor shaft 5 than the coil side $a$. In the slot between teeth B and C lies now the other coil side $b$ as first coil side to be wound in here and consequently is located close to the bottom 44 of this slot. This slot between teeth B and C takes an additional coil side $c$ of the coil to be wound next, and this coil side, of course, must lie on top of coil side $b$ in this slot. It will by now be realized how the overlapping configuration of coil ends on the face of the carrier disc 23 develops. In conclusion it is well to remember that the first coil side $a$ lies directly at the bottom 44 of a slot 41 and that every following coil overlaps with one side a side of a previous coil, and this system follows from coil to coil up to the last coil to be wound in. This last coil lies with both of its coil sidees $z$ on top in contrast to the first coil which lies completely on the bottom.

The production of the toothed carrier disc 23 of insulating material, as provided by the invention and as previously described, is inexpensive, since in its simplest form it can be blanked from sheet material. The hub 35 (FIG. 3), which completes the rigid connection between the disc 23 and its wound armature 22 with the motor shaft 5, can be secured in the disc 23, for example, by a knurled portion on the hub pressed into a punched hole in the disc and riveted over, so that transmission of the driving torque from the armature to the shaft is assured.

Figure 9:
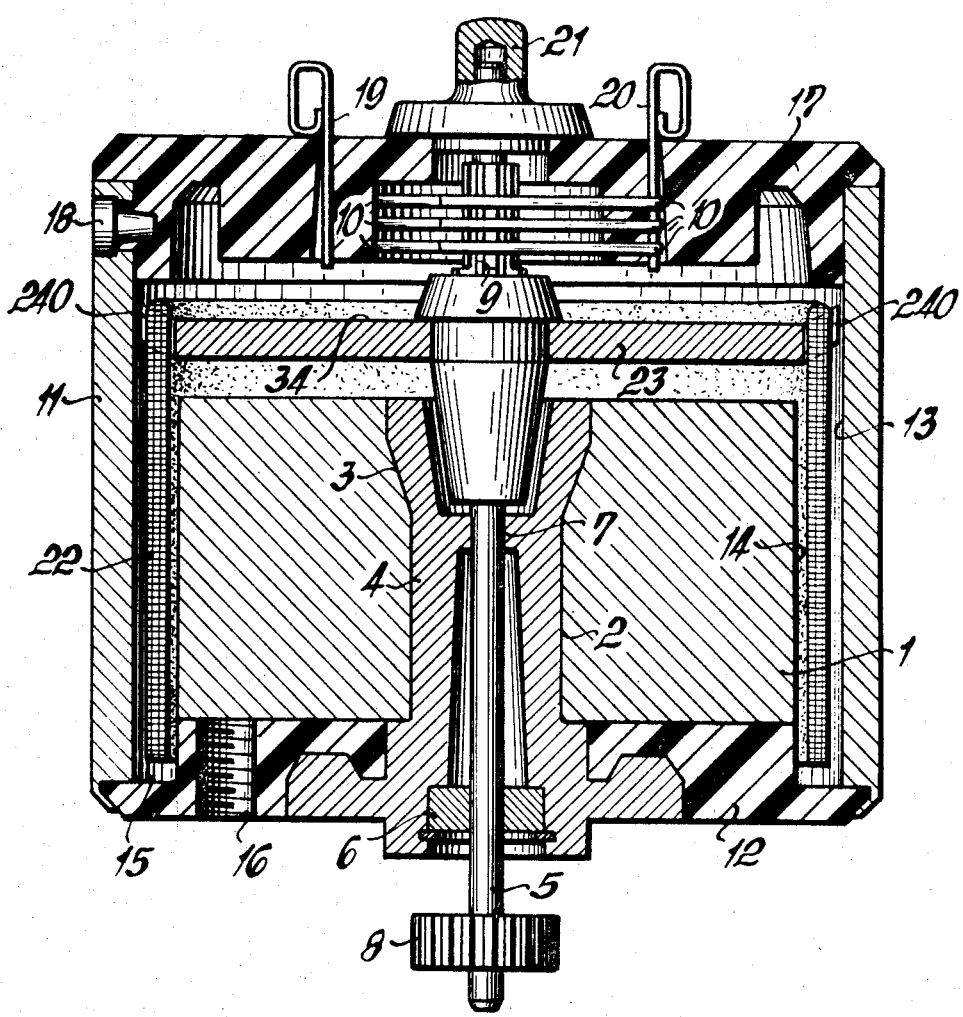
FIG. 9 is a schematic cross-sectional view of a direc-current motor having a bell-type armature similar to FIG. 1, but here equipped with a toothed carrier disc wherein the teeth at the periphery are slanting toward relatively to the face of the disc.

The already mentioned modified form of a carrier disc having slanting teeth extending from its periphery will now be more fully described:

For that purpose, there is illustrated in FIG. 9 a motor having only slight modifications from that of FIG. 1. But again it should be remembered that the motor proper may be of an entirely different construction and still not avoid the invention as long as its teachings are utilized. This is the case, when the motor is characterized in being an electric direct-current motor equipped with a bell-type armature having an overhang winding free and open at one end and carried at the other end by a carrier disc for mounting it rigidly on the motor shaft for rotatable movement in the motor housing.

Reverting to FIG. 9, there again the core magnet 1 is provided with an axial bore lined with a non-magnetic bushing 4. The motor shaft 5 is journaled in a stationary bearing 6 and also in the bushing 4 at 7, and if desirable, also in an end bearing 21. The drive means is again shown as a pinion 8. Rigidly secured to the shaft 5, opposite to the shaft extension with pinion 8, is the commutator 9 on which the commutator brushes 10 ride. The hollow cylindrical stationary housing 11, forming the magnetic flux return path, is secured in position on the core magnet 1 by an annular end plate 12 of non-magnetic material. The position of housing 11 is such that a proper air gap 15 is formed between its cylindrical inner surface 13 and the cylindrical outer surface 14 of core magnet 1. At the commutator end, the motor housing 11 is closed by using suitable means, such as radial screws or the like, for rigidly fastening to the motor housing 11 an end cover or motor end bell 17. The motor leads 19 and 20 to the outside are preferably molded into cover 17 and then electrically connected to the two sets of brushes 10. The bell-type armature winding 22 has clearance to rotate freely in the air gap 15 and is open at the drive end identified by pinion 8. At the other or commutator end the hollow-cylinder portion of the armature in the air gap is secured to a carrier disc 23 mounted on the motor shaft 5 to rotate therewith and extending radially to abut with the armature to be secured thereto. For securing the armature winding 22, the carrier disc 23 is provided around its periphery with teeth 240 which in this modification are inclined or slanted with respect to the plane of the carrier disc 23 and project on account of this fact from the outer face 34 of this disc toward the motor end cover 17. The slant from the plane of the disc may amount to, say, 30 degrees. In radial direction, the slanting teeth 240 extend somewhat beyond the winding 22 and lie thus substantially in alignment with the air gap 15 of the motor. All teeth 240 are of the same size, have the same shape, and the same slant or inclination. For reason of similar inclination it can be imagined that all teeth lie within the jacket surface of a cone pointing toward the open end of the armature winding which is also the drive end of the motor. The number of teeth 240 has a predetermined certain relationship to the number of coils in the armature and the number of commutator segments. The number of coils wound to form the armature is thereby equal to the number of teeth 240 or the number of slots.

To convey a clear picture of the configuration of the carrier disc 23 with slanting teeth, a perspective diagrammatic view of such a disc is illustrated in FIG. 10. As can be clearly seen, the teeth 240 project at an angle upwardly (as shown) from the plane face of the disc at its outer edge 440. The angle of inclination is indicated by dot-and-dash lines which are extended to the apex 45 of an imagined cone, which, when in the motor, coincides with a point in the motor axis. The teeth 240 are shown in FIG. 10 exaggeratedly narrow leaving relatively wide slots 410. This showing to impress the fact that for bell-type armatures such relationship of tooth to slot is favorable because the coils consist here mostly of a multitude of wires particularly in fine-wire winding.

A single tooth 240, greatly enlarged, is shown in FIG. 11. The tooth 240 is represented as seen when looking from a cross-section of the disc 23 outwardly. As shown, the tooth is considerably longer than wide. Teeth of this proportion leave relatively wide slots in the disc. In contrast thereto, the straight radially extending teeth, as shown in FIGS. 1 to 8, are preferably wide, i.e., they are wider than long. This results in relatively narrow slots. It is, of course, also possible to make the slanting teeth 240 wider than diagramamtically shown in FIGS. 10 and 11 without departing from the features of this invention.

The manner in which a carrier disc 23 made of thermoplastic material can be adapted for the present objective will now be described with reference to FIGS. 12 and 13. The slanting teeth 241 are being embraced by the wires or coils during the winding procedure. Thus, the carrier disc 23 itself is actually "wound in" into the winding during the winding of the armature 22, whose portion in the air gap consists of the winding itself, and is thereby securely combined therewith. With the winding in place, the material of the teeth, extending beyond the winding 22, is heated, for example, by a suitable electric heating fixture, and made pliable. Thereafter, the still pliable tooth ends are molded over the coil ends of the winding in front of the disc 23 so that these coil ends and also the tooth ends are pressed into the slots and thereabout to form a solid bead around the periphery of the disc. The FIG. 13 illustrates the disc 23 and winding 22 combination after the remolding of teeth 241. The mold for reshaping the teeth is preferably combined with the heating fixture so that plasticizing of the teeth and remolding becomes a single production step. After cooling the tooth 241 maintains its new and final shape and position. A tight, solid and undetachable joint between winding 22 and its carrier disc 23 has thus been created. This method of anchoring the teeth 241 in the winding 22 makes possible the construction of rotors in which no projection, neither of tooth nor of coil, extends radially beyond the outer cylindrical surface of the armature. A motor equipped with such rotor can be built with a very small air gap, a fact which is beneficial to the efficiency and output of the motor.

All of the aforementioned tooth formations of the carrier disc 23 have one feature in common, namely every tooth is embraced by one commutator-sided loop of wire or coil end of the bell-type armature, whereby wires exclusively in the range of the teeth, i.e., in front of the teeth, project beyond the face of the armature without the formation of so-called winding heads. The latter feature is particularly true with multi-polar windings and axially extending parallel coils in which the number of coils is equal to the number of poles; and is further especially true with a skewed winding according to United States Patent No. 3,191,081 in which the loops of the coil ends at the commutator side embrace each one tooth, i.e., pass through both slots adjacent to this particular tooth. However, with this skewed winding, the number of poles is not binding on the selection of the number of teeth.

At this point for further explanation of the invention, some remarks concerning the production methods employed in the manufacture of the bell-type armature for direct-current motors and in utilization of the toothed carrier disc provided by this invention, appear appropriate. The begin with, the toothed carrier disc of insulating material, eventually with the printed-circuit commutator already on its face, is set in the winding fixture.

This winding fixture is equipped with the customary winding arbor on one end of which the toothed carrier disc 23, having straight or slanting teeth in accordance with this invention, is arranged. At the other end of the arbor, there are arranged pins around which the magnet wire is carried while winding. When these pins, used to form the open or mouth end of the armature, are removed after the winding is completed, the whole assembly of carrier disc 23 and winding 22 can be readily taken off from the arbor. It is now a winding unit with the winding securely carried at one end by the disc 23 and open ended and self-supporting at the other end. Subsequent connecting of the armature leads and soldering the same to the segments of the commutator presents no problem.

The great advantage of a bell-type armature as herein described resides, besides other favorable features, in the very light weight of the rotor and consequently its negligible inertia, because it has no shell whatsoever for supporting the winding in the air gap. The low inertia assures practically instant start to full speed. Moreover, the construction is simple and the manufacturing costs are low.

What I claim is:

1. A direct-current motor comprising a stationary core magnet having a cylindrical outer surface and an axially extending center bore, a stationary more housing coaxially surrounding said core magnet and having an inner cylindrical surface arranged in spaced concentric relation to said cylindrical outer surface of said core magnet to form an annular air gap between said inner and outer surfaces, and a rotor unit comprising a motor shaft rotatably mounted in said center bore, a single circular carrier disc provided on its circumference with teeth and rigidly secured to said motor shaft adjacent to one end of said core magnet, a hollow cylindrical self-supporting armature winding attached with one of its ends to said carrier disc and arranged for rotational movement in said annular air gap, said winding being composed of coils having end loops of which the ones at one end of said winding embrace the teeth on said carrier disc and are secured in the slots formed between said teeth only, the other end of said hollow cylindrical winding extending freely and unsupported into said annular air gap, and a commutator on the side of the carrier disc facing away from said core magnet and conductively connected with said winding.

2. A direct-current motor according to claim 1, wherein said winding comprises a plurality of coils of which the first coil is placed at one end of the armature with both of its sides on the bottom of adjacent slots in said carrier disc, while the following coils are placed in overlapping relation with one of their sides on the bottom and the other sides at the top end in the slots, the last coil being placed with both of its sides at the top end in adjacent slots in said carrier disc (FIGS. 6 and 7).

3. A direct-current motor according to claim 1, in which the teeth on the circumference of said circular carrier disc are inclined from the plane of said carrier disc toward the location of said commutator, said teeth being sufficiently long to project radially beyond the cylindrical outer surface of the winding and axially beyond the outer face of said carrier disc.

4. A direct-current motor according to claim 3, in which said inclined teeth which project axially beyond the outer face of said carrier disc are bent and molded over the adjacent end portion of the winding (FIG. 13).

5. A direct-current motor according to claim 3, in which said inclined teeth projecting radially beyond the cylindrical outer surface of the winding are bent and molded over to be substantially flush with the outer circumference of said winding (FIG. 13).

6. A rotor unit for a direct-current motor of the type described, including a shaft, a circular carrier disc provided with uniformly spaced teeth on its circumference rigidly secured to said shaft, a self-supporting hollow cylindrical armature winding disposed coaxially and concentrically around said shaft and secured with one of its ends to the periphery of said carrier disc, said winding consisting of a plurality of coils each having a curved portion embracing one of said teeth, said curved portions projecting from one end face of said carrier disc and being crimped toward said shaft for forming a reinforcing bead extending along the inner circumferential portion of said carrier disc.

7. A rotor unit for a direct-current motor of the type described, including a shaft, a circular carrier disc provided with uniformly spaced teeth on its circumference rigidly secured to said shaft, a self-supporting hollow cylindrical armature winding disposed coaxially and concentrically around said shaft and secured with one of its ends to the periphery of said carrier disc, said winding consisting of a plurality of coils each having a curved portion embracing one of said teeth, said curved portions projecting from one end face of said carrier disc and being crimped toward said shaft for forming a reinforcing bead extending along the inner circumferential portion of said carrier disc, the other end of said hollow cylindrical armature winding being crimped radially outwardly away from said shaft to form an outwardly disposed annular bead.

8. A rotor unit according to claim 6, in which said teeth on the circumference of said carrier disc project in radial as well as lateral direction a considerable distance beyond said hollow cylindrical armature winding so as to act also as vanes which promote the flow of air along said winding for cooling the same when the rotor unit is rotating.

9. A rotor unit according to claim 6, in which said radial teeth on the circumference of said carrier disc are also inclined outwardly away from the outer face of the carrier disc.

10. A rotor unit according to claim 6, in which said radial teeth on the circumference of said carrier disc are also inclined outwardly away from the outer face of the carrier disc, whereby all of said inclined teeth are of uniform size and have all the same angle of inclination with respect to the face of said carrier disc.

11. A rotor unit according to claim 6, in which said radial teeth on the circumference of said carrier disc are also inclined outwardly away from the outer face of the carrier disc, whereby all of said inclined teeth are of uniformly size and have all the same angle of inclination of about 30° with respect to the face of said carrier disc, so that they lie upon an imaginary conical surface whose apex lies in the center axis of said shaft.

12. A rotor unit as claimed in claim 9, in which the length of said inclined teeth is greater than their width (FIG. 11).

13. A rotor unit as claimed in claim 9, in which said inclined teeth are rounded at their outer ends (FIG. 11).

References Cited

UNITED STATES PATENTS

| | | | |
|---|---|---|---|
| 768,982 | 8/1904 | Duncan | 310—266 |
| 3,159,764 | 12/1964 | Henry-Baudot | 310—268 |
| 3,213,797 | 10/1965 | McMahan | 310—52 |
| 3,356,877 | 12/1967 | Burr | 310—266 |

FOREIGN PATENTS

| | | |
|---|---|---|
| 1,151,065 | 7/1963 | Germany. |

OTHER REFERENCES

German printed application 71,286 (1961).

MILTON O. HIRSHFIELD, Primary Examiner

R. SKUDY, Assistant Examiner